(12) United States Patent
Sarshar

(10) Patent No.: US 9,349,135 B2
(45) Date of Patent: May 24, 2016

(54) METHOD AND SYSTEM FOR CLUSTERING SIMILAR ITEMS

(71) Applicant: Nima Sarshar, San Jose, CA (US)

(72) Inventor: Nima Sarshar, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 267 days.

(21) Appl. No.: 13/954,704

(22) Filed: Jul. 30, 2013

(65) Prior Publication Data

US 2015/0039431 A1 Feb. 5, 2015

(51) Int. Cl.
*G06Q 30/00* (2012.01)
*G06Q 30/02* (2012.01)
*G06F 17/30* (2006.01)

(52) U.S. Cl.
CPC ........ *G06Q 30/0256* (2013.01); *G06Q 30/0251* (2013.01); *G06Q 30/0255* (2013.01); *G06F 17/30864* (2013.01); *G06F 17/30867* (2013.01)

(58) Field of Classification Search
CPC .......... G06Q 30/0251; G06Q 30/0255; G06Q 30/0256; G06F 17/30705–17/30713; G06F 17/30864; G06F 17/30867
USPC .................... 705/14.49, 14.53, 14.54, 26–27; 707/737–740, 708, 771
See application file for complete search history.

(56) References Cited

U.S. PATENT DOCUMENTS

| | | | | |
|---|---|---|---|---|
| 6,792,422 B1 * | 9/2004 | Stride | .................... | G06Q 40/00 705/35 |
| 7,136,490 B2 * | 11/2006 | Martinez | ................. | G06F 21/31 380/284 |
| 7,386,487 B2 * | 6/2008 | Leggett | .................. | G06Q 30/00 705/26.64 |
| 7,437,368 B1 * | 10/2008 | Kolluri et al. | | |
| 7,672,865 B2 * | 3/2010 | Kumar | ................... | G06Q 10/04 705/7.29 |
| 7,685,021 B2 * | 3/2010 | Kumar | ................... | G06Q 10/04 705/26.2 |
| 7,685,114 B2 * | 3/2010 | Brunswig et al. | ...... | 707/999.004 |
| 7,703,672 B2 * | 4/2010 | Umeya et al. | ................. | 235/380 |
| 7,716,161 B2 * | 5/2010 | Dean | ...................... | G06Q 30/02 705/14.49 |
| 7,899,824 B2 * | 3/2011 | Akinaga et al. | ............... | 707/737 |

(Continued)

FOREIGN PATENT DOCUMENTS

KR    10-2013-001718    2/2013

OTHER PUBLICATIONS

International Search Report in corresponding International Application No. PCT/US2013/053017, mailed Apr. 24, 2014 (5 pages).

(Continued)

*Primary Examiner* — Bennett Sigmond
(74) *Attorney, Agent, or Firm* — Osha Liang LLP

(57) ABSTRACT

A method and system for selecting a product to advertise. The method includes receiving an advertisement request from an application, generating a plurality of nodes corresponding to a plurality of user-entered text strings received from a user by the application, sending, to a marketplace system, a plurality of search queries for the plurality of user-entered text strings, and receiving a plurality of product identifier in response to the plurality of search queries. The method further includes determining a plurality of edges corresponding to the plurality of product identifiers, generating a cluster using the plurality of nodes and the plurality of edges, selecting a product identifier of the plurality of product identifiers to obtain a selected product identifier, and providing, to the application, the selected product identifier, wherein the application displays, to the user, an advertisement for the product identified by the product identifier.

20 Claims, 12 Drawing Sheets

(56) References Cited

U.S. PATENT DOCUMENTS

| | | | |
|---|---|---|---|
| 8,260,664 B2* | 9/2012 | Vadlamani | G06F 17/30864 705/14.49 |
| 8,407,214 B2* | 3/2013 | Li | G06F 17/30672 707/726 |
| 8,423,547 B2* | 4/2013 | Liu et al. | 707/736 |
| 8,473,349 B1* | 6/2013 | Manber et al. | 705/14.49 |
| 8,719,302 B2* | 5/2014 | Bailey | G06F 17/30705 707/607 |
| 2002/0087631 A1* | 7/2002 | Sharma | 709/203 |
| 2004/0059708 A1* | 3/2004 | Dean | G06Q 30/02 |
| 2004/0215543 A1* | 10/2004 | Betz | G06Q 20/02 705/35 |
| 2006/0031123 A1* | 2/2006 | Leggett | G06Q 30/00 705/26.64 |
| 2007/0034684 A1* | 2/2007 | Umeya | G06Q 20/04 235/380 |
| 2007/0073702 A1* | 3/2007 | Brunswig | G06F 9/4448 |
| 2007/0094067 A1* | 4/2007 | Kumar | G06Q 10/04 705/26.2 |
| 2008/0052152 A1 | 2/2008 | Yufik | |
| 2008/0059458 A1* | 3/2008 | Byron | G06F 17/30705 |
| 2008/0167992 A1* | 7/2008 | Kokernak | G06Q 10/0637 705/51 |
| 2008/0255967 A1* | 10/2008 | Shi | G06Q 30/0603 705/26.3 |
| 2009/0171948 A1* | 7/2009 | Solomon et al. | 707/5 |
| 2009/0327260 A1* | 12/2009 | Li | G06F 17/30672 |
| 2010/0088321 A1* | 4/2010 | Solomon et al. | 707/749 |
| 2010/0100443 A1* | 4/2010 | Hoashi | G06Q 30/0256 705/14.54 |
| 2010/0161406 A1* | 6/2010 | Narayan Vedam | G06Q 30/02 705/14.41 |
| 2010/0161411 A1* | 6/2010 | Wu | G06Q 30/02 705/14.45 |
| 2010/0179998 A1* | 7/2010 | Matteini | H04W 4/206 709/206 |
| 2010/0324996 A1 | 12/2010 | Kim et al. | |
| 2011/0295678 A1 | 12/2011 | Seldin et al. | |
| 2012/0005021 A1* | 1/2012 | Ratnam | 705/14.54 |
| 2012/0016863 A1* | 1/2012 | Bernhardt | G06F 17/30705 707/710 |
| 2012/0059732 A1* | 3/2012 | Dakka et al. | 705/26.4 |
| 2012/0078719 A1* | 3/2012 | Bhagwan et al. | 705/14.54 |
| 2012/0143801 A1* | 6/2012 | Tsuchida | G06N 99/005 706/12 |
| 2012/0203632 A1* | 8/2012 | Blum | G06Q 30/0255 705/14.53 |
| 2012/0259703 A1 | 10/2012 | Stahura et al. | |
| 2012/0259850 A1* | 10/2012 | Liu | G06F 17/30864 707/737 |
| 2012/0265736 A1* | 10/2012 | Williams | G06F 17/30731 707/692 |
| 2013/0054364 A1* | 2/2013 | Lyon | 705/14.54 |
| 2014/0019451 A1* | 1/2014 | Buryak | G06F 17/3071 707/737 |
| 2014/0019452 A1* | 1/2014 | He et al. | 707/737 |
| 2014/0244685 A1* | 8/2014 | Hay et al. | 707/769 |
| 2014/0258330 A1* | 9/2014 | Cheng et al. | 707/771 |
| 2015/0039431 A1* | 2/2015 | Sarshar | G06Q 30/0251 705/14.54 |

OTHER PUBLICATIONS

Written Opinion in corresponding Patent Application No. PCT/US2013/053017, mailed Apr. 24, 2014 (4 pages).

* cited by examiner

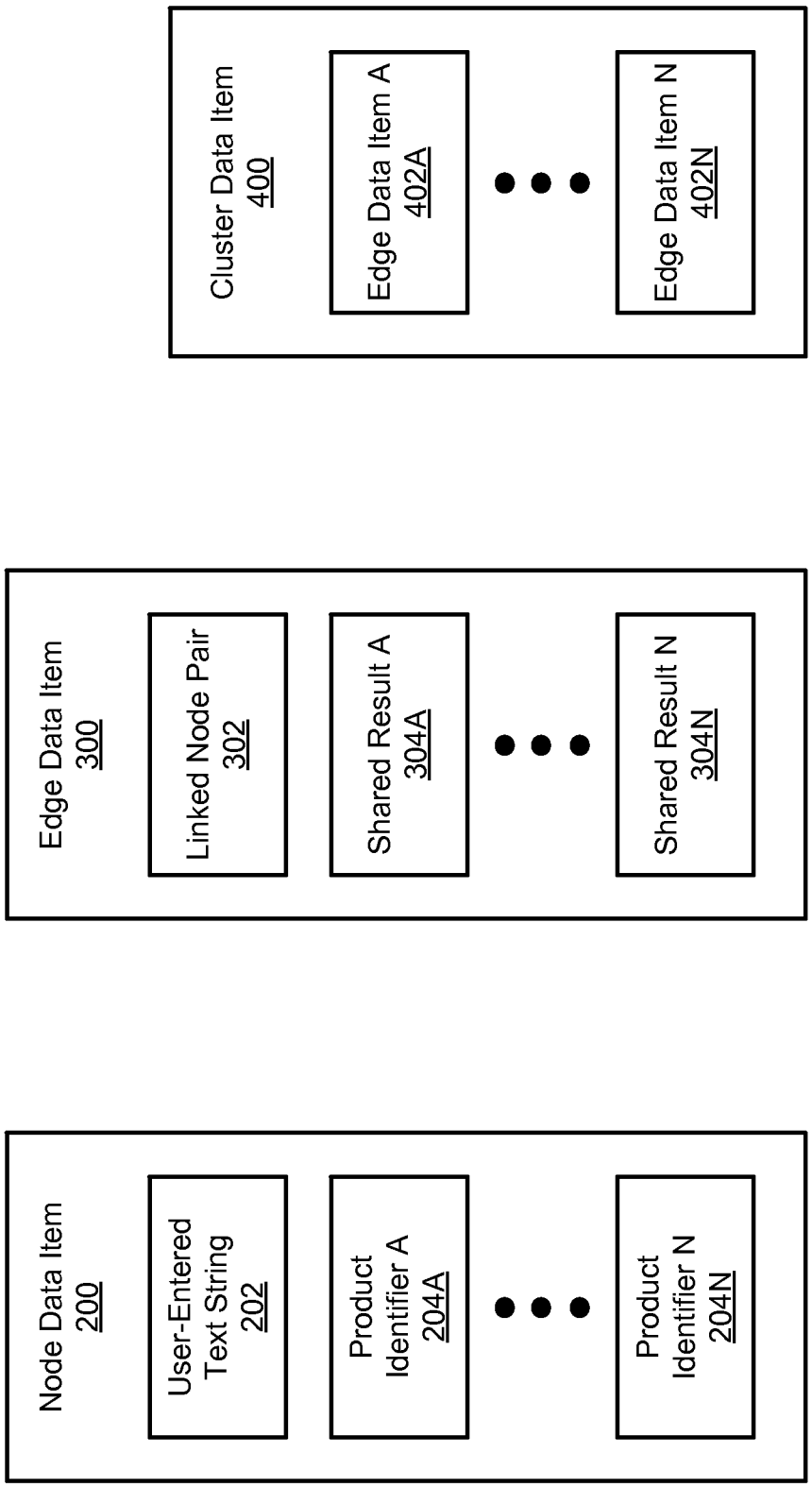

Display
806

Purchase Management Application
808

| Product | Price | Date Purchaced |
|---|---|---|
| "Dual-Band Router" | $134.56 | 02/08/11 |
| "Gigabit Router" | $148.25 | 05/17/08 |
| "X4 Router" | $169.35 | 11/15/09 |
| "X4 Ethernet Switch" | $203.68 | 09/15/12 |
| "Gigabit Switch" | $114.02 | 01/30/10 |
| "Eight-Port Switch" | $122.79 | 08/01/10 |
| "Eight-Port USB" | $42.98 | 03/16/12 |

| Node | P1 | P2 | P3 | P4 | P5 | P6 | P7 |
|---|---|---|---|---|---|---|---|
| User-Entered Text String | "Dual-Band Router" | "Gigabit Router" | "X4 Router" | "X4 Ethernet Switch" | "Gigabit Switch" | "Eight-Port Switch" | "Eight-Port USB" |
| Search Results | Product A<br>Product B<br>Product C<br>Product D<br>Product E | Product A<br>Product B<br>Product D<br>Product F | Product B<br>Product C<br>Product F<br>Product G | Product G<br>Product H<br>Product I<br>Product J<br>Product K | Product H<br>Product I<br>Product J<br>Product L<br>Product M | Product H<br>Product I<br>Product K<br>Product L<br>Product N | Product N<br>Product O |

| Edge | E1 | E2 | E3 | E4 | E5 | E6 | E7 | E8 |
|---|---|---|---|---|---|---|---|---|
| Linked Node Pair | P1-P2 | P1-P3 | P2-P3 | P3-P4 | P4-P5 | P4-P6 | P5-P6 | P6-P7 |
| Shared Results | Product A<br>Product B<br>Product D | Product B<br>Product C | Product B<br>Product F | Product G | Product H<br>Product I<br>Product J | Product H<br>Product I<br>Product K | Product H<br>Product I<br>Product L | Product N |

*FIG. 8E*

| Product | Price | Date Purchased |
|---|---|---|
| "Dual-Band Router" | $134.56 | 02/08/11 |
| "Gigabit Router" | $148.25 | 05/17/08 |
| "X4 Router" | $169.35 | 11/15/09 |
| "X4 Ethernet Switch" | $203.68 | 09/15/12 |
| "Gigabit Switch" | $114.02 | 01/30/10 |
| "Eight-Port Switch" | $122.79 | 08/01/10 |
| "Eight-Port USB" | $42.98 | 03/16/12 |

Purchase Management Application 808

Advertisement For Product B 880

Display 806

FIG. 8H

METHOD AND SYSTEM FOR CLUSTERING SIMILAR ITEMS

BACKGROUND

Many business and personal financial management applications may be accessed and utilized free of charge. Frequently, these applications are monetized using advertisements placed within the application or with advertising opportunities presented based on information provided by the user of the application. Of particular value are advertisements tailored to the interests or needs of a user. Such tailored advertising benefits from informed assumptions made using available information about the user.

SUMMARY

In general, in one aspect, embodiments of the invention relate to a system including a computer processor, a clustering engine, and an application. The clustering engine is executing on the computer processor and is configured to receive an advertisement request from an application, generate, in response to the request, a plurality of nodes corresponding to a plurality of user-entered text strings received from a user by the application, send, to a marketplace system, a plurality of search queries for the plurality of user-entered text strings, and receive a plurality of product identifier in response to the plurality of search queries. The clustering engine is further configured to determine, for the plurality of nodes, a plurality of edges corresponding to the plurality of product identifiers, generate a cluster using the plurality of nodes and the plurality of edges, select, from an edge of the plurality of edges, a product identifier of the plurality of product identifiers to obtain a selected product identifier, and provide, to the application, the selected product identifier, wherein the selected product identifier identifies a product. The application is also executing on the computer processor and is configured to send the advertisement request to the clustering engine, receive, in response to the advertisement request, the selected product identifier, and display, to the user, an advertisement for the product identified by the product identifier.

In general, in one aspect, embodiments of the invention relate to a method for selecting a product to advertise. The method includes receiving, by a clustering engine executing on a computer processor, an advertisement request from an application, generating, by the clustering engine in response to the request, a plurality of nodes corresponding to a plurality of user-entered text strings received from a user by the application, sending, to a marketplace system, a plurality of search queries for the plurality of user-entered text strings, and receiving a plurality of product identifier in response to the plurality of search queries. The method further includes determining, for the plurality of nodes, a plurality of edges corresponding to the plurality of product identifiers, generating, by the clustering engine, a cluster using the plurality of nodes and the plurality of edges, selecting, by the clustering engine from an edge of the plurality of edges, a product identifier of the plurality of product identifiers to obtain a selected product identifier, and providing, to the application, the selected product identifier, wherein the application displays, to the user, an advertisement for the product identified by the product identifier.

In general, in one aspect, embodiments of the invention relate to a computer readable medium comprising instructions that, when executed by a computer processor, perform a method for selecting a product to advertise. The method includes receiving, by a clustering engine executing on a computer processor, an advertisement request from an application, generating, by the clustering engine in response to the request, a plurality of nodes corresponding to a plurality of user-entered text strings received from a user by the application, sending, to a marketplace system, a plurality of search queries for the plurality of user-entered text strings, and receiving a plurality of product identifier in response to the plurality of search queries. The method further includes determining, for the plurality of nodes, a plurality of edges corresponding to the plurality of product identifiers, generating, by the clustering engine, a cluster using the plurality of nodes and the plurality of edges, selecting, by the clustering engine from an edge of the plurality of edges, a product identifier of the plurality of product identifiers to obtain a selected product identifier, and providing, to the application, the selected product identifier, wherein the application displays, to the user, an advertisement for the product identified by the product identifier.

Other aspects of the invention will be apparent from the following description and the appended claims.

BRIEF DESCRIPTION OF DRAWINGS

FIG. 2 shows a system in accordance with one or more embodiments of the invention.

FIG. 3 shows a system in accordance with one or more embodiments of the invention.

FIG. 4 shows a system in accordance with one or more embodiments of the invention.

FIGS. 8A-8H show an example in accordance with one or more embodiments of the invention.

DETAILED DESCRIPTION

Figure 1:
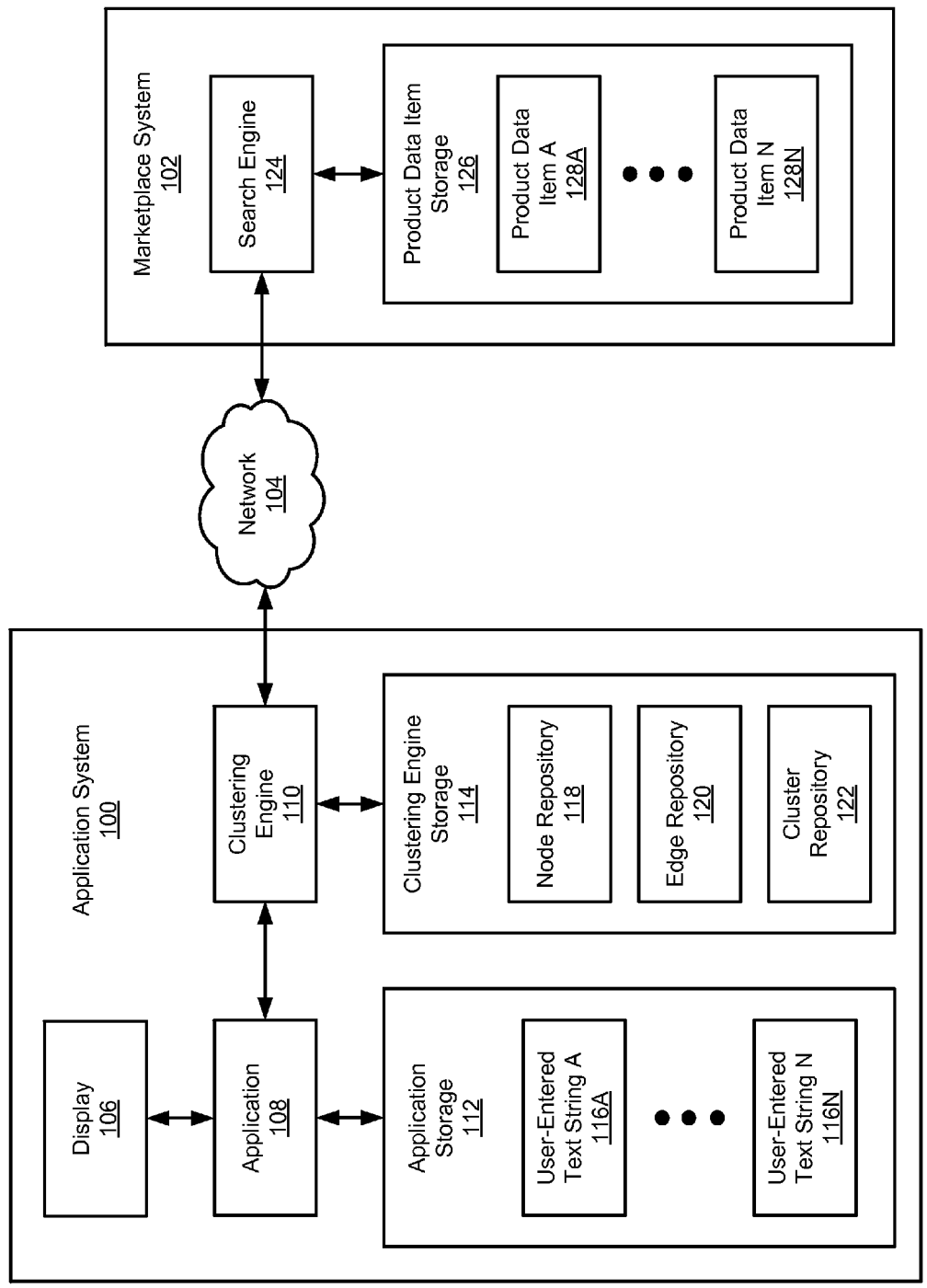
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for determining products related to user-entered product descriptions for advertising purposes. Specifically, embodiments of the invention may be used to cluster user-entered descriptions of commercial items and match those descriptions to related products in an external catalog.

FIG. 1 shows a diagram of a system in accordance with one or more embodiments of the invention. As shown in FIG. 1, the system includes an application system (100) and a marketplace system (102) communicatively coupled together via a network (104) (e.g., the Internet). The application system (100) includes a display (106), an application (108), a clustering engine (110), application storage (112), and clustering engine storage (114). The application storage (112) includes a number of user-entered text strings (user-entered text string A (116A), user-entered text string N (116N)). The clustering engine storage (114) includes a node repository (118), an edge repository (120), and a cluster repository (122). The marketplace system (102) includes a search engine (124) and product data item storage (126). The product data item storage (126) includes a number of product data items (product data item A (128A), product data item N (128N)).

In one or more embodiments of the invention, the application system (100) is a computer system or group of computer systems with functionality to execute the application (108), clustering engine (110), application storage (112), and clustering engine storage (114). In one or more embodiments of the invention, application system (100) is a personal computer (e.g., desktop computer, laptop computer, tablet, smartphone, etc.) under the control of a user.

In one or more embodiments of the invention, the application (108) is a process or group of processes with functionality to receive user-generated text input and store the user-generated text as user-generated text strings (user-entered text string A (116A), user-entered text string N (116N)). Further, the application (108) may also include the functionality to generate an advertisement from a product data item, and display (e.g., via display (106)) the advertisement to a user of the application system (100).

In one or more embodiments of the invention, the application (108) is implemented as a financial management application. Specifically, the application (108) may receive the user-generated text as a description of a product purchased by the user or business. An application (108) implemented as accounting software may use the collection of products purchased by the user or business to track personal expenditures or business expenditures. Alternatively, application (108) may be implemented as cataloging software or inventory software that uses the collection of user-generated text to track products owned or products in stock. As used herein, the term product is intended to include products and services.

In one or more embodiments of the invention, the application system (100) is a server system that hosts a server-side application (108). Such a server-side application (108) may interact with a client-side application executing on a client system (not shown) operated by a user. For example, the application (108) may be implemented as a web application executing on a web server (i.e., application system (100)). The web application may be accessed by users via Internet browsers executing on client systems (not shown).

In one or more embodiments of the invention, the application storage (112) is a combination of hardware and software (e.g., a file system and persistent storage device) with functionality to store user-generated text as user-generated text strings (user-entered text string A (116A), user-entered text string N (116N)). In one or more embodiments of the invention, the user-entered text strings (user-entered text string A (116A), user-entered text string N (116N)) is a data item encapsulating a collection of characters intended to describe a product. In one or more embodiments of the invention, a user-generated text string (user-entered text string A (116A), user-entered text string N (116N)) includes a generic name for the product and/or the name of the manufacturer, seller, or provider (e.g., "Cybernet router"). Further, the user-generated text string (user-entered text string A (116A), user-entered text string N (116N)) may also include a product identifier (e.g., "Cybernet A130 router").

In one or more embodiments of the invention, the application storage (112) includes two or more user-generated text strings (user-entered text string A (116A), user-entered text string N (116N)) intended to describe the same product. For example, different instances of user-generated text strings (user-entered text string A (116A), user-entered text string N (116N)) for the same product may be added each time that product is purchased (i.e., the same product purchased in different transactions on different dates). Each instance of user-generated text strings (user-entered text string A (116A), user-entered text string N (116N)) for the same product may be identical, similar, or different.

In one or more embodiments of the invention, the user-generated text strings (user-entered text string A (116A), user-entered text string N (116N)) are inexact descriptors of a product. Specifically, because the user-generated text strings (user-entered text string A (116A), user-entered text string N (116N)) are descriptions entered by users, the user-generated text strings (user-entered text string A (116A), user-entered text string N (116N)) may include abbreviations, shorthand, and/or misspellings. Consequently, in one or more embodiments of the invention, a single user may have entered two or more different user-generated text strings (user-entered text string A (116A), user-entered text string N (116N)) to describe the same product purchased at different times (e.g., "Cybernet A130", "A130 router", "cyberrouter", and "A1130" all intended to describe a model A130 router made by Cybernet).

In one or more embodiments of the invention, the clustering engine (110) is a process or group of processes with functionality to generate clusters using user-generated text strings (user-entered text string A (116A), user-entered text string N (116N)) and provide a product data item based on the clusters. In one or more embodiments of the invention, a cluster includes a number of nodes linked by edges. In one or more embodiments of the invention, each node corresponds to a user-generated text string (user-entered text string A (116A), user-entered text string N (116N)). In one or more embodiments of the invention, each edge between nodes corresponds to product results from the search engine (124) shared by each node connected by that edge. Each edge may also include an edge value indicating the number of shared results returned from the search engine (124). Further detail about the functionality of the clustering engine (110) is provided in FIGS. 5, 6, and 7.

In one or more embodiments of the invention, the clustering engine storage (114) is a combination of hardware and software (e.g., a file system and persistent storage device) with functionality to store the node repository (118), the edge repository (120), and the cluster repository (122). In one or more embodiments of the invention, the node repository (118) is a combination of hardware and software with functionality to store node data items. Specifically, the node repository (118) includes functionality to store node data items describing nodes created by the clustering engine (110). Further detail about node data items is provided in FIG. 2.

In one or more embodiments of the invention, the edge repository (120) is a combination of hardware and software with functionality to store edge data items. Specifically, the edge repository (120) includes functionality to store edge data items describing edges between nodes created by the clustering engine (110). Further detail about edge data items is provided in FIG. 3.

In one or more embodiments of the invention, the cluster repository (122) is a combination of hardware and software with functionality to store cluster data items. Specifically, the cluster repository (122) includes functionality to store cluster data items describing clusters of nodes and edges created by the clustering engine (110). Further detail about cluster data items is provided in FIG. 4.

In one or more embodiments of the invention, the marketplace system (102) is a computer system or group of computer systems with functionality to execute the search engine (124) and the product data item storage (126). Specifically, the marketplace system (102) may host a set of applications with functionality to provide a searchable repository of product information. Further, the marketplace system may also provide functionality to facilitate the purchase of one or more products. In one or more embodiments of the invention, the marketplace system (102) may be implemented as a computer system hosting an e-commerce website.

In one or more embodiments of the invention, the search engine (124) is a process or group of processes with functionality to receive a search query and, in response, provide a number of product identifiers or product data items that satisfy or match the search query. In one or more embodiments of the invention, the search results are provided as a list of product identifiers (e.g., Internet uniform resource locators (URLs)) that indicate the location of the product data item or a point of sale website for the product on the marketplace system (102). In one or more embodiments of the invention, the search query includes a user-generated text string (user-entered text string A (116A), user-entered text string N (116N).

In one or more embodiments of the invention, the product data item storage (126) is a combination of hardware and software (e.g., a file system and persistent storage device) with functionality to store the product data items (product data item A (128A), product data item N (128N)). In one or more embodiments of the invention, the product data items (product data item A (128A), product data item N (128N)) are data items corresponding to products that may be purchased through the marketplace system. Each product data item (product data item A (128A), product data item N (128N)) may include data used to present a point of sale website for the corresponding product. Product data items (product data item A (128A), product data item N (128N)) may include, for example, details about a product, a product price, product availability, delivery information, product reviews, etc. Product data items (product data item A (128A), product data item N (128N)) may also include advertising information for the application system (100), such as an advertising priority, compensation for presenting an advertisement, compensation for a sale resulting from the advertisement, etc. Each product data item may be accessible using a product identifier such as an Internet URL.

In one or more embodiments of the invention, the clustering engine (110) and the cluster engine storage (114) are components of the application (108) and the application storage (112). In one or more embodiments of the invention, the clustering engine (110) and clustering engine storage (114) are executing on a computer system separate from the application system (100), and may be under the control of an entity separate from the entity controlling the application system (100). In one or more embodiments of the invention, the clustering engine (110) and the clustering engine storage (114) are executing on the marketplace system (102).

FIG. 2 shows a node data item in accordance with one or more embodiments of the invention. As shown in FIG. 2, the node data item (200) includes a user-generated text string (202) and a number of product identifiers (product identifier A (204A), product identifier N (204N)). In one or more embodiments of the invention, each node corresponds to a user-entered text string, and each node data item (e.g., node data item (200)) stores information about the node.

In one or more embodiments of the invention, the user-generated text string (202) is retrieved from the application storage and submitted to a marketplace system as a search query. In one or more embodiments of the invention, the product identifiers (product identifier A (204A), product identifier N (204N)) are received as search results by the clustering engine in response to the search query. In one or more embodiments of the invention, additional information about a product (e.g. from the corresponding product data item) may also be stored in the node data item (200). Further detail about generating node data items (e.g., node data item (200)) is provided in FIG. 6.

FIG. 3 shows an edge data item in accordance with one or more embodiments of the invention. As shown in FIG. 3, the edge data item (300) includes a linked node pair (302) and a number of shared results (shared result A (304A), shared result N (304N)). In one or more embodiments of the invention, some nodes may be connected by edges. Edges between nodes indicate that the two nodes share at least one search result (e.g., product identifiers) in common. Further, edges may include an edge value indicting the number of shared results between the two nodes.

In one or more embodiments of the invention, the linked node pair (302) includes an identifier of the nodes (e.g., references to the node data items) connected by the edge. In one or more embodiment of the invention, the shared results (shared result A (304A), shared result N (304N)) store product identifiers corresponding to the search results shared between the nodes. Further detail about generating edge data items (e.g., edge data item (300)) is provided in FIG. 7.

FIG. 4 shows a cluster data item in accordance with one or more embodiments of the invention. As shown in FIG. 4, the cluster data item (400) includes a number of edge data items (edge data item A (402A), edge data item N (402N). In one or more embodiments of the invention, cluster data items (e.g., cluster data item (400)) are generated by applying a clustering algorithm to the group of node data items and edge data items in the clustering engine storage. In one or more embodiments of the invention, edges within a cluster may share product identifiers (i.e., shared results). Further detail about generating cluster data items (e.g., cluster data item (400)) is provided in FIG. 5.

Figure 5:
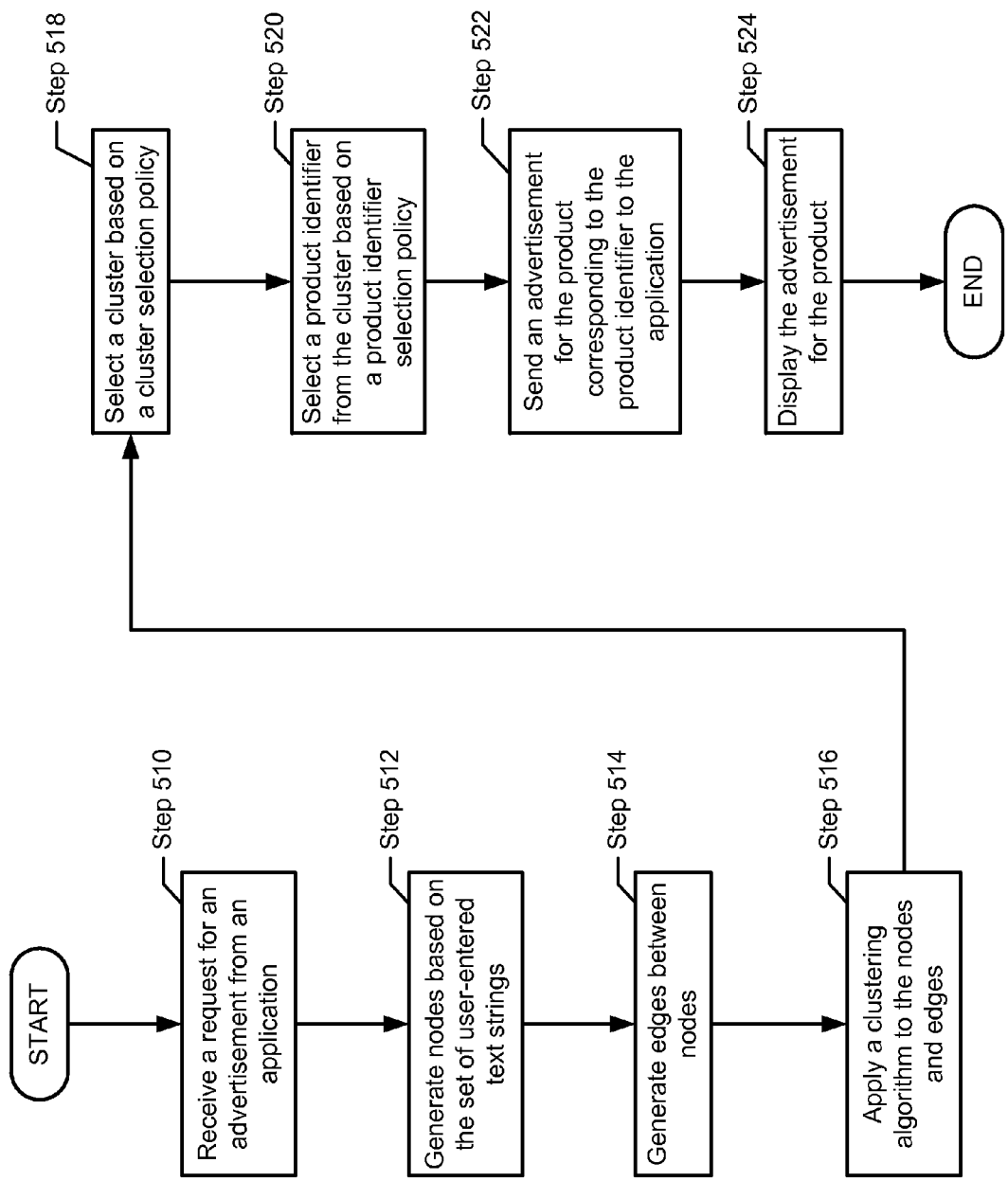
FIG. 5 shows a flow diagram in accordance with one or more embodiments of the invention.

FIG. 5 shows a flowchart for determining a product related to user-entered text strings in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 510, the clustering engine receives a request for a related product data item from an application. In Step 512, generates nodes based on the set of user-entered text strings using the process described in FIG. 6. In Step 514, the clustering engine generates edges between the nodes using the process described in FIG. 7.

In Step 516, the clustering engine applies a clustering algorithm to the nodes and edges. In one or more embodiments of the invention, a clustering algorithm is a way in which groups of nodes and edges are separated such that the nodes and edges of one group are more similar to each other than the nodes and edges in other groups. Applying a clustering algorithm to nodes and edges may result in one or more nodes and/or edges being deleted or dismissed. Examples of clustering algorithms include, but are not limited to, k-means algorithms, hierarchical algorithms, and expectation-maximization algorithms. Clustering algorithms not listed here may be applied without exceeding the scope of the invention.

In Step 518, the clustering engine selects a cluster based on the cluster selection policy. In one or more embodiments of the invention, the cluster selection policy instructs the clustering engine to select one cluster over a group of clustered based on the characteristics of the group of clusters. Examples of cluster selection policies include selecting the cluster with the greatest number of nodes, selecting the cluster with the greatest number of edges, selecting the cluster with the greatest aggregate edge value, selecting the cluster with the highest single edge value, selecting a cluster that has not been recently selected, selecting a cluster that would share no edges with a recently selected cluster, etc.

In Step 520, the clustering engine selects a product identifier from the cluster based on the product identifier selection policy. In one or more embodiments of the invention, the product identifier selection policy instructs the clustering engine to select one product identifier stored in one of the edges over the other product identifiers stored the same edge and different edges. Examples of product identifier selection policies include selecting the most frequently occurring product identifier in the group of edges, selecting a product identifier from the edge with the highest edge value, selecting the product identifier according to advertising information stored in the product data items corresponding to each product identifier (e.g., the product identifier with the highest compensation, etc.), etc.

In Step 522, the clustering engine sends and advertisement for the product corresponding to the product identifier to the application. In one or more embodiments of the invention, the clustering engine uses the selected product identifier to retrieve the product data item from the marketplace system, and generates an advertisement using the product data item. In one or more embodiments of the invention, the clustering engine sends the product identifier to the application and the application generates the advertisement using the product identifier. In one or more embodiments of the invention, the advertisement is generated by the marketplace system in response to an advertisement request (e.g., sent by the application or the clustering engine) that includes the product identifier.

In Step 524, the application displays the advertisement for the product. In one or more embodiments of the invention, the advertisement is a graphical and/or textual element placed within the application and provides information about the product. In one or more embodiments of the invention, the advertisement includes a mechanism by which the user is able to purchase the product from the marketplace system. For example, the advertisement may include an Internet address of the point of sale website for the product on the marketplace system. In one or more embodiments of the invention, the user is able to use the advertisement to purchase the product from the marketplace system.

Figure 6:
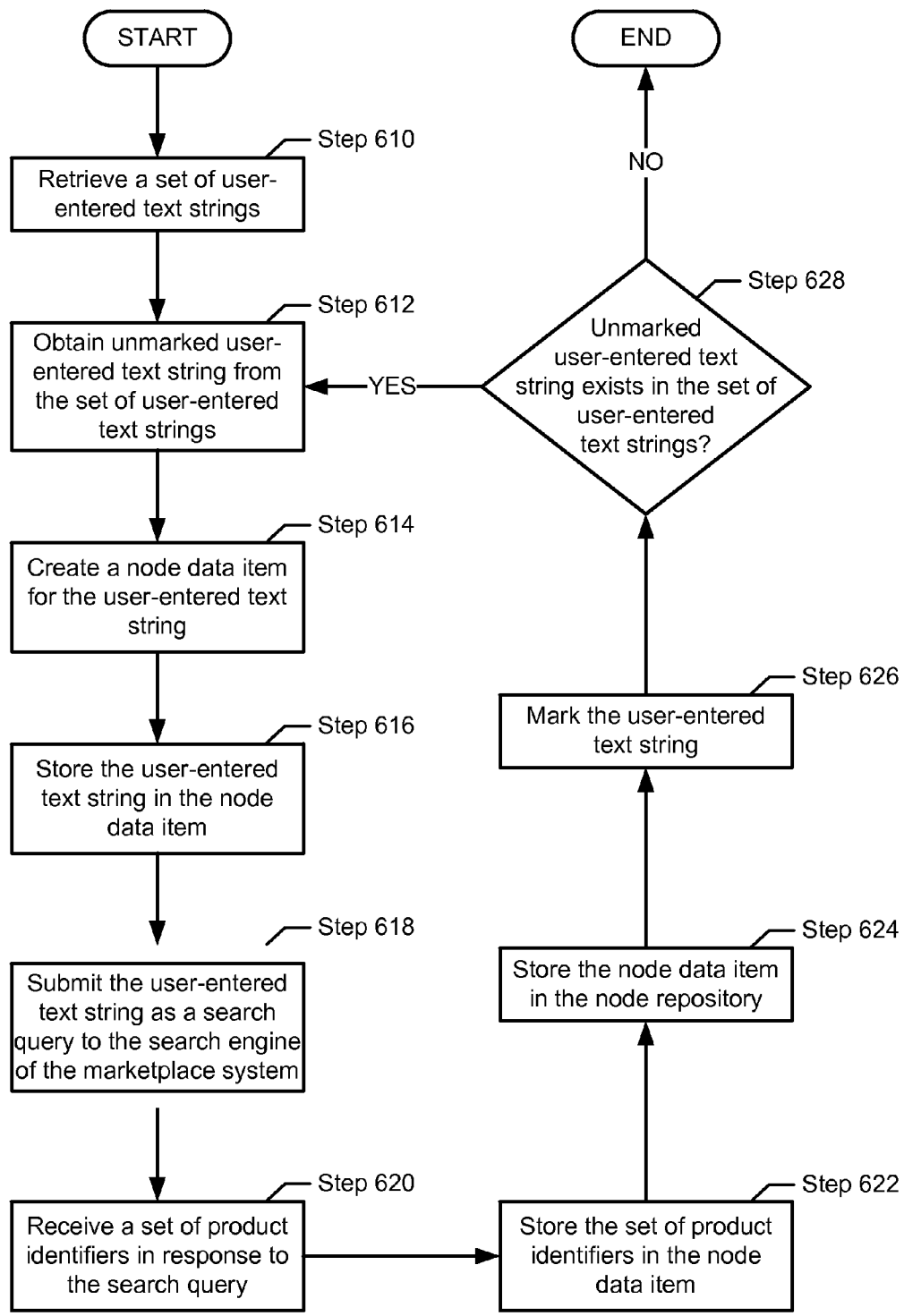
FIG. 6 shows a flow diagram in accordance with one or more embodiments of the invention.

FIG. 6 shows a flowchart for generating nodes in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Set 610, the clustering engine retrieves a set of user-entered text strings from the application storage. In Step 612, the clustering engine obtains an unmarked user-entered text string from the set of user-entered text strings. In one or more embodiments of the invention, marking unmarked user-entered text strings is a mechanism by which the clustering engine may iterate over each user-generated text string in the set of user-generated text strings.

In Step 614, the clustering engine creates a node data item for the user-entered text string. In Step 616, the clustering engine stores the user-entered text string in the node data item. In Step 618, the clustering engine submits the user-entered text string as a search query to the search engine of the marketplace system. In Step 620, the clustering engine receives a set of product identifiers as search results in response to the search query. In one or more embodiments of the invention, the search results include product data items.

In one or more embodiments of the invention, the search results correspond to a list of products that match or satisfy the search query. In one or more embodiment of the invention, the search results correspond to the search engine's best effort to determine which products in the product data item storage are described by the search query (i.e., the user-entered text string).

And Step 622, the clustering engine stores the set of product identifiers (or product data items) in the node data item. In Step 624, the clustering engine stores the node data item in the node repository. In Step 626, the user-entered text string is marked as having been searched. In Step 628, the clustering engine determines whether an unmarked (i.e., unsearched) user-entered text string exists in the set of user-entered text strings. If in Step 628, at least one unmarked user-entered text string exists in the set of user-entered text strings, then the flow returns to Step 612. If in Step 628, the clustering engine determines that no unmarked user-entered text strings exist in the set of user-entered text strings (i.e., all user-entered text strings have been submitted as search queries and corresponding nodes have been generated) than the flow ends.

Figure 7:
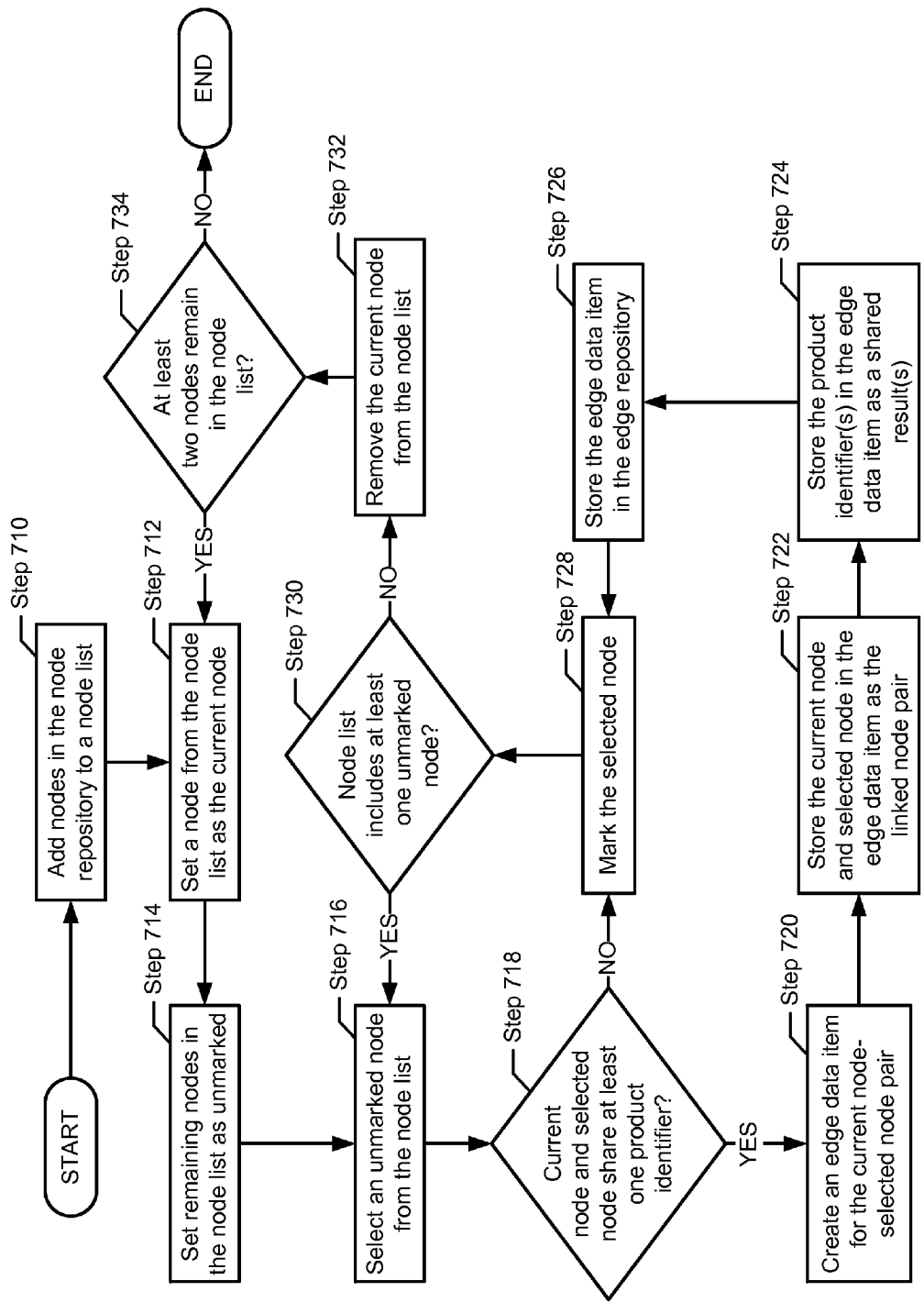
FIG. 7 shows a flow diagram in accordance with one or more embodiments of the invention.

FIG. 7 shows a flowchart for generating edges in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 710, the clustering engine adds the nodes in the node repository to a node list. In Step 712, the clustering engine sets a node from the node list at the current node. In Step 714, the clustering engine sets the remaining nodes in the node list as unmarked (i.e., not yet compared to the current node to determine shared results). In Step 716, the clustering engine selects an unmarked node (i.e., a node that has not been compared to the current node) from the node list.

In Step 718, the clustering engine determines whether the current node and the selected node share at least one product identifier. In one or more embodiments of the invention, the clustering engine compares the product identifiers stored in the current node data item to the product identifiers stored in the selected node data item. If in Step 718, the clustering engine determines that the current node and the selected node share at least one product identifier, then in Step 720, the clustering engine creates an edge data item for the current node-selected node pair.

In Step 722, the clustering engine stores the current node and the selected node in the edge data item as the linked node pair. In one or more embodiments of the invention, an identifier for the current node and an identifier for the selected node are stored as the linked node pair in the edge data item. In Step 724, the clustering engine stores the product identifier or product identifiers in the edge data item as share results. In Step 726, the clustering engine stores the edge data item in the edge repository.

If in Step 718, the clustering engine determines that the current node and the selected node do not share at least one product identifier, then no edge is created and in Step 728, the selected node is marked as having been compared to the current node. In Step 730, the clustering engine determines whether the node list includes at least one unmarked node (i.e., at least one node that has not been compared to the current node). If in Step 730, the clustering engine determines that the node list includes at least one unmarked node, then the flow returns to Step 716. If in Step 730, the clustering engine determines that the node list does not include at least one unmarked node (i.e., all nodes in the node list have been compared to the current node), then in Step 732, the clustering engine removes the current node from the node list.

In Step 734, the clustering engine determines whether at least two nodes remain in the node list. In one or more embodiments of the invention, if only a single node remains in the node list, then that node has already been compared to all other nodes, and the flow ends. If in Step 734, the clustering engine determines that at least two nodes remain in the node list, then the flow returns to Step 712. If in Step 734, the clustering engine determines that there are not at least two nodes in the node list, then the flow ends.

Figure 8A:
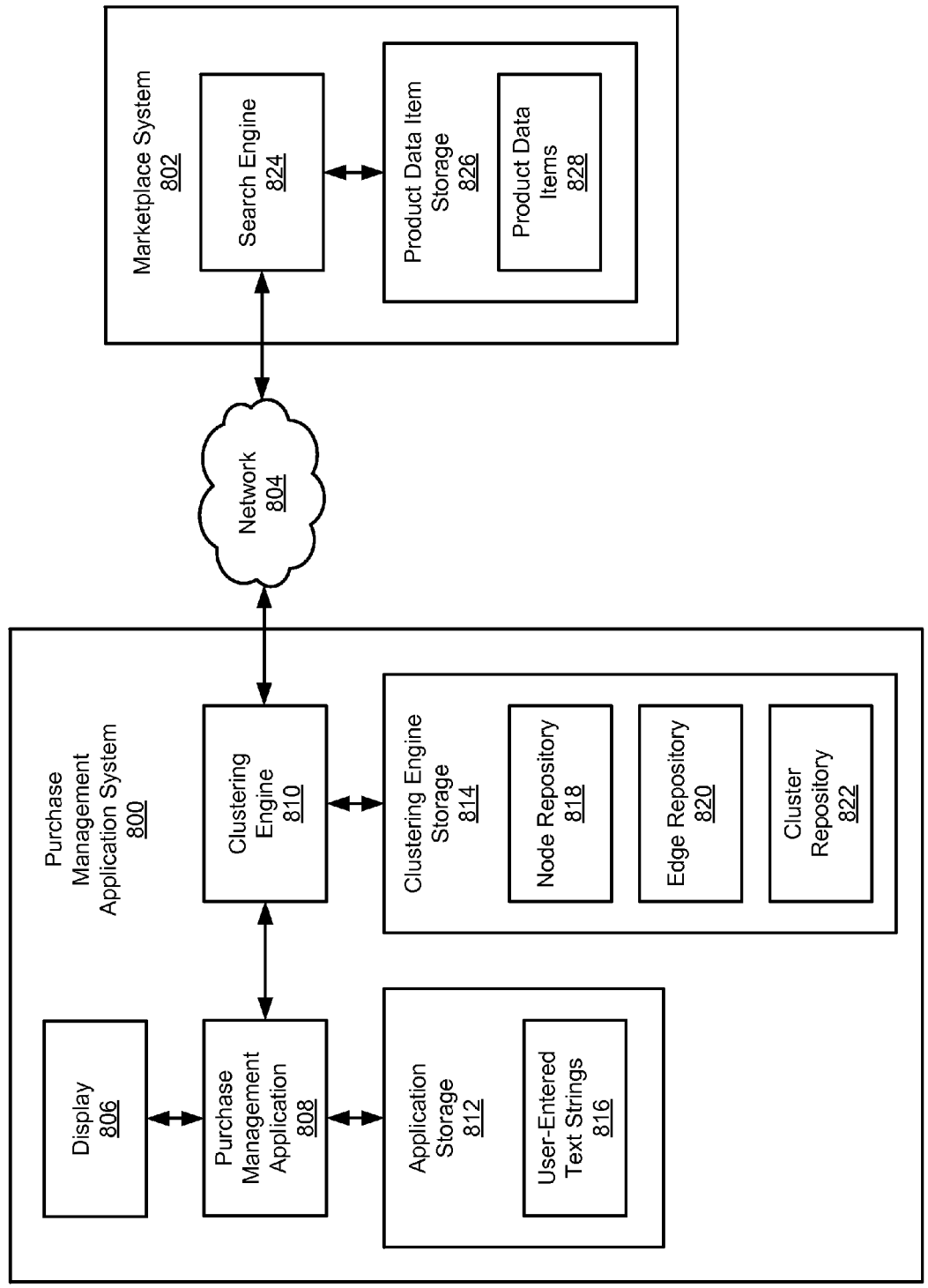

FIGS. 8A-8H show an example in accordance with one or more embodiments of the invention. FIG. 8A shows an example system in accordance with one or more embodiments of the invention. As shown in FIG. 8A, the example system includes a purchase management application system (800) and a marketplace system (802) communicatively coupled together via the network (804). The purchase management application system (800) includes a display (806), a purchase management application (808), a clustering engine (810), application storage (812), and clustering engine storage (814). The application storage (812) includes seven user-entered text strings represented by user-entered text strings (816). The clustering engine storage (814) includes a node repository (818), an edge repository (820), and a cluster repository (822). The marketplace system (802) includes a search engine (824) and product data item storage (826). The product data item storage (826) includes a number of product data items represented by product data items (828)).

FIG. 8B shows an example graphical user interface (GUI) in accordance with one or more embodiments of the invention. As shown in FIG. 8B, the display (806) shows a GUI component of the purchase management application (808). For the purposes of the example, assume that the purchase management application (808) is an application used to store information about purchases made by the user. As shown in FIG. 8B, the user has entered purchase information for seven transactions. The purchase information includes a product, a price, and a date purchased. Each product field includes a user-entered text string for each transaction.

Figure 8C:
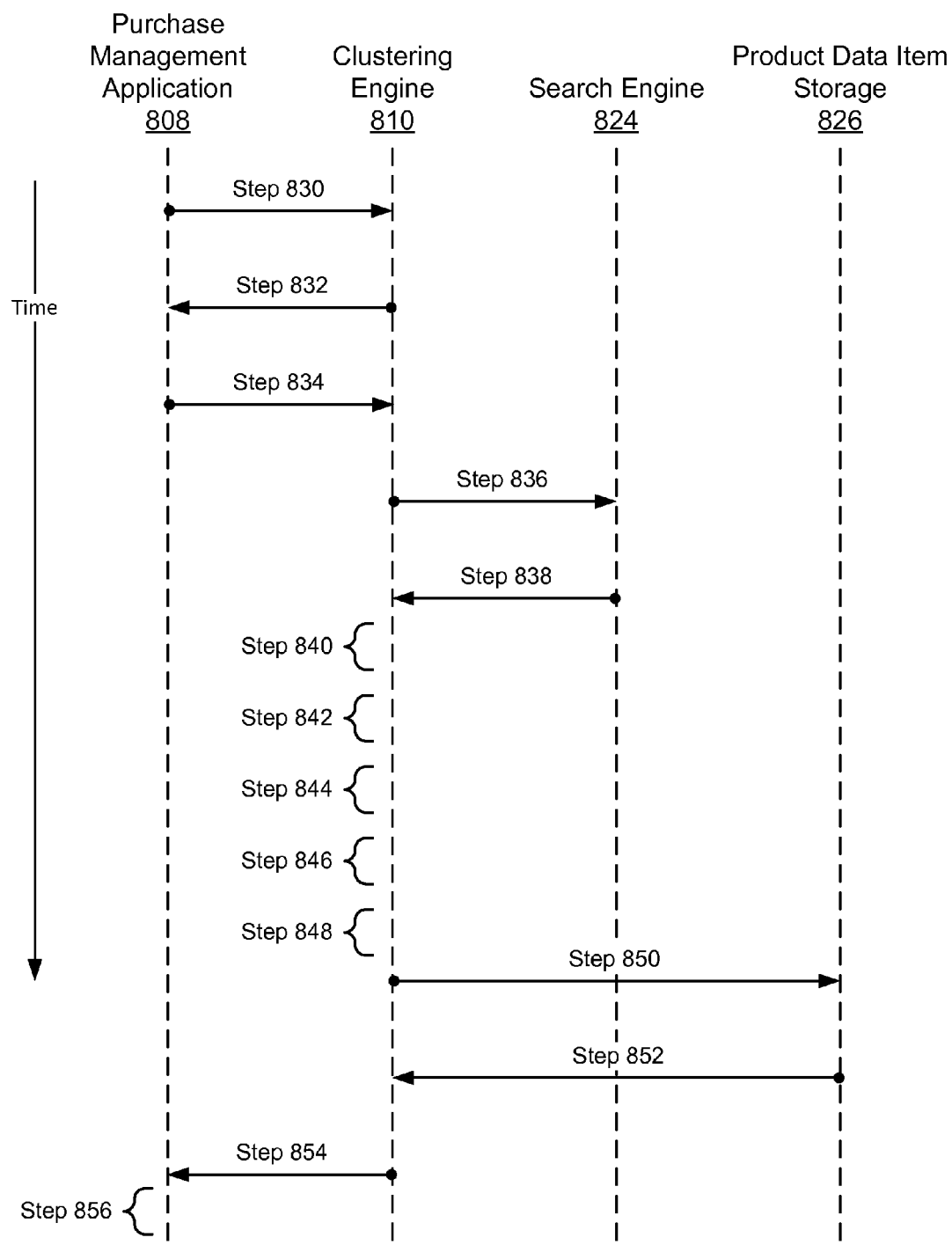

FIG. 8C shows an example timeline in accordance with one or more embodiments of the invention. In Step 830, the purchase management application (808) requests an advertisement from the clustering engine (810). In Step 832, the clustering engine (810) retrieves a set of user-entered text strings from the purchase management application (808). In Step 834, the purchased management application (808) provides the set of user-entered text strings to the clustering engine (810). The set of user-entered text strings in this example includes the following seven user-entered text strings: "Dual-Band Router", "Gigabit Router", "X4 Router", "X4 Ethernet Switch", "Gigabit Switch", "Eight-Port Switch", and "Eight-Port USB".

In Step 836, the clustering engine (810) sends the user-entered text string "Dual-Band Router" to the search engine (824) as a search query. In Step 838, the clustering engine (810) receives a set of product identifiers as search results in response to the search query for the user-entered text string "Dual-Band Router". In this example, the search results include product identifiers for five products: product A, product B, product C, product D, and product E. In Step 840, the clustering engine (810) generates a node data item and stores the user-entered text string "Dual-Band Router" and the product identifiers in the node data item. Also in Step 840, the generated node data item is stored in the node repository (818).

Step 836, Step 838, and Step 840 are repeated for each user-entered text string in the set of user-entered text strings. FIG. 8D shows an example table of nodes in accordance with one or more embodiments of the invention. Specifically, the example table in FIG. 8D shows the data stored in the seven node data items (850) created by the clustering engine (810) in Step 836, Step 838, and Step 840 in FIG. 8C.

Returning to FIG. 8C, in Step 842, the clustering engine (810) generates edge data items for the set of nodes stored in the node repository (818) by comparing each node to all other nodes to determine any shared results between each pair of nodes. FIG. 8E shows an example table of edges in accordance with one or more embodiments of the invention. Specifically, the example table in FIG. 8E shows the data stored in the eight edge data items (855) created by the clustering engine (810) in Step 842 in FIG. 8C.

Figure 8F:
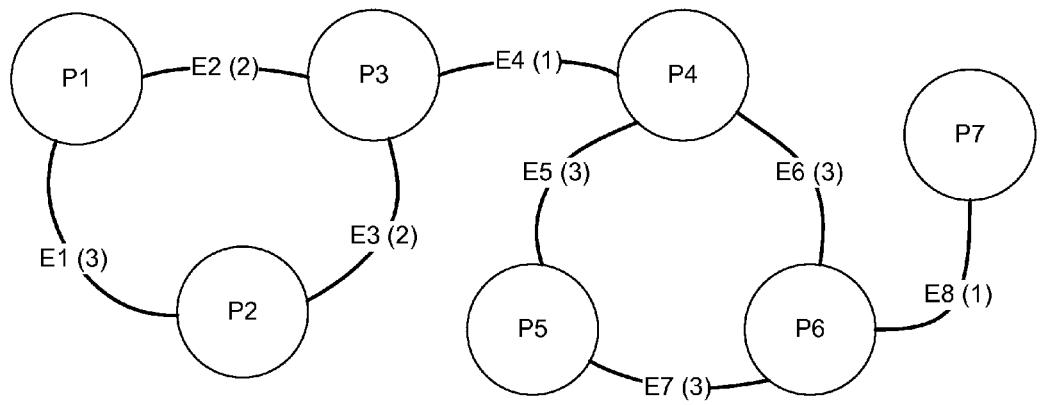

FIG. 8F shows a graphical representation of the relationship between the nodes and edges described by the node data items and the edge data items. Each node (e.g., P1, P2, P3, P4, P5, P6, P7) corresponds to a node data item. Specifically, P1 corresponds to "Dual-Band Router", P2 corresponds to "Gigabit Router", P3 corresponds to "X4 Router", P4 corresponds to "X4 Ethernet Switch", P5 corresponds to "Gigabit Switch", P6 corresponds to "Eight-Port Switch", and P7 corresponds to "Eight-Port USB". Each edge (e.g., E1, E2, E3, E4, E5, E6, E7, E8) corresponds to an edge data item (i.e., at least one shared result between two nodes). Each edge (e.g., E1, E2, E3, E4, E5, E6, E7, E8) also includes an edge value (e.g., 3, 2, 2, 1, 3, 3, 3, 1, respectively) indicating the number of shared results between the associated nodes.

Figure 8G:
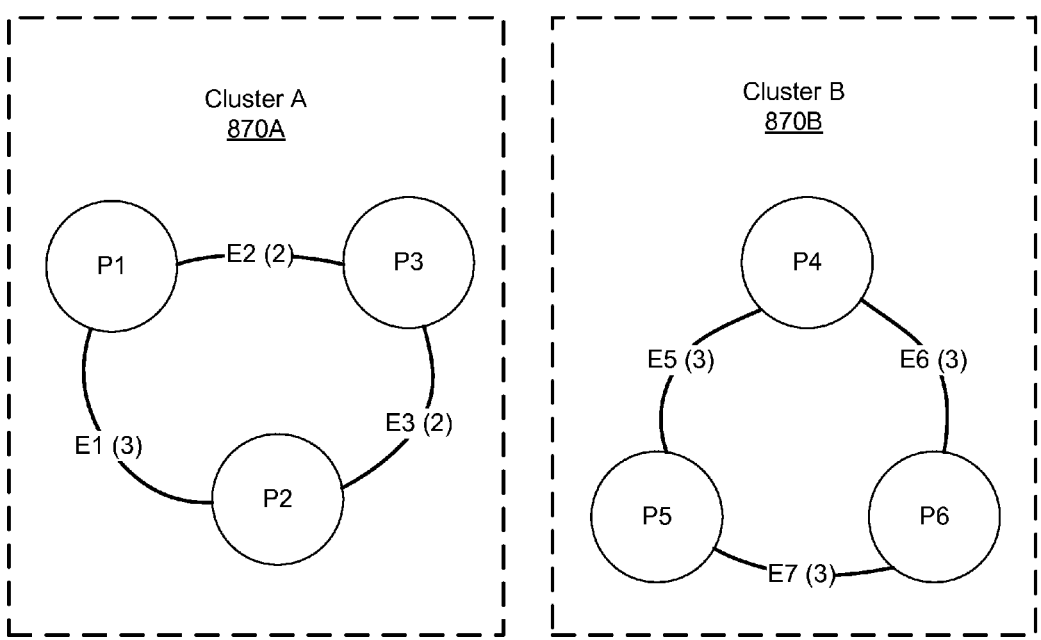

Returning to FIG. 8C, in Step 844, the clustering engine (810) applies a clustering algorithm to the nodes and edges. For the purposes of the example, assume that the clustering algorithm removes from consideration any edge with an edge value lower than two, and any node not connected by an edge with an edge value of at least two. FIG. 8G shows a graphical representation of the clusters generated (in Step 844) by applying the clustering algorithm to the collection of nodes and edges. Specifically, FIG. 8G shows that two clusters have emerged (e.g., cluster A (870A), cluster B (870B)) once the edges with edge values lower than two (E4 and E8) are removed, and the nodes not connected by an edge with an edge value of at least two (P7).

Returning to FIG. 8C, in Step 846, the clustering engine (810) selects one of the generated clusters (e.g., cluster A (870A), cluster B (870B)) according to a cluster selection policy. Assume for the purposes of the example, that the cluster selection policy instructs the clustering engine (810) to select the cluster with the lowest aggregate edge value. Accordingly, cluster A (870A) is selected.

In Step 848, the clustering engine (810) selects a product identifier from cluster A (870A) according to a product identifier selection policy. Assume for the purposes of the example, that the product identifier selection policy instructs the clustering engine (810) to select the most frequently occurring product identifier from the edges of the cluster.

Product B is in all three edges, and is the most frequently occurring. Accordingly, the clustering engine selects the product identifier for product B.

In Step 850, the clustering engine (810) uses the product identifier for product B to retrieve the product data item for product B. In Step 852, the clustering engine (810) receives the product data item for product B from the product data item storage (826) on the marketplace system (802) and generates an advertisement for product B using the product data time. In Step 854, the clustering engine (810) provides the advertisement for product B to the application. In Step 856, the purchase management application (808) displays the advertisement for product B using the display (806). FIG. 8H shows an example GUI in accordance with one or more embodiments of the invention. Specifically, FIG. 8H shows an example graphical user interface after Step 850 has been performed. As shown in FIG. 8H, the purchase management application (808) has displayed an advertisement for product B (880) on the display (806).

Figure 9:
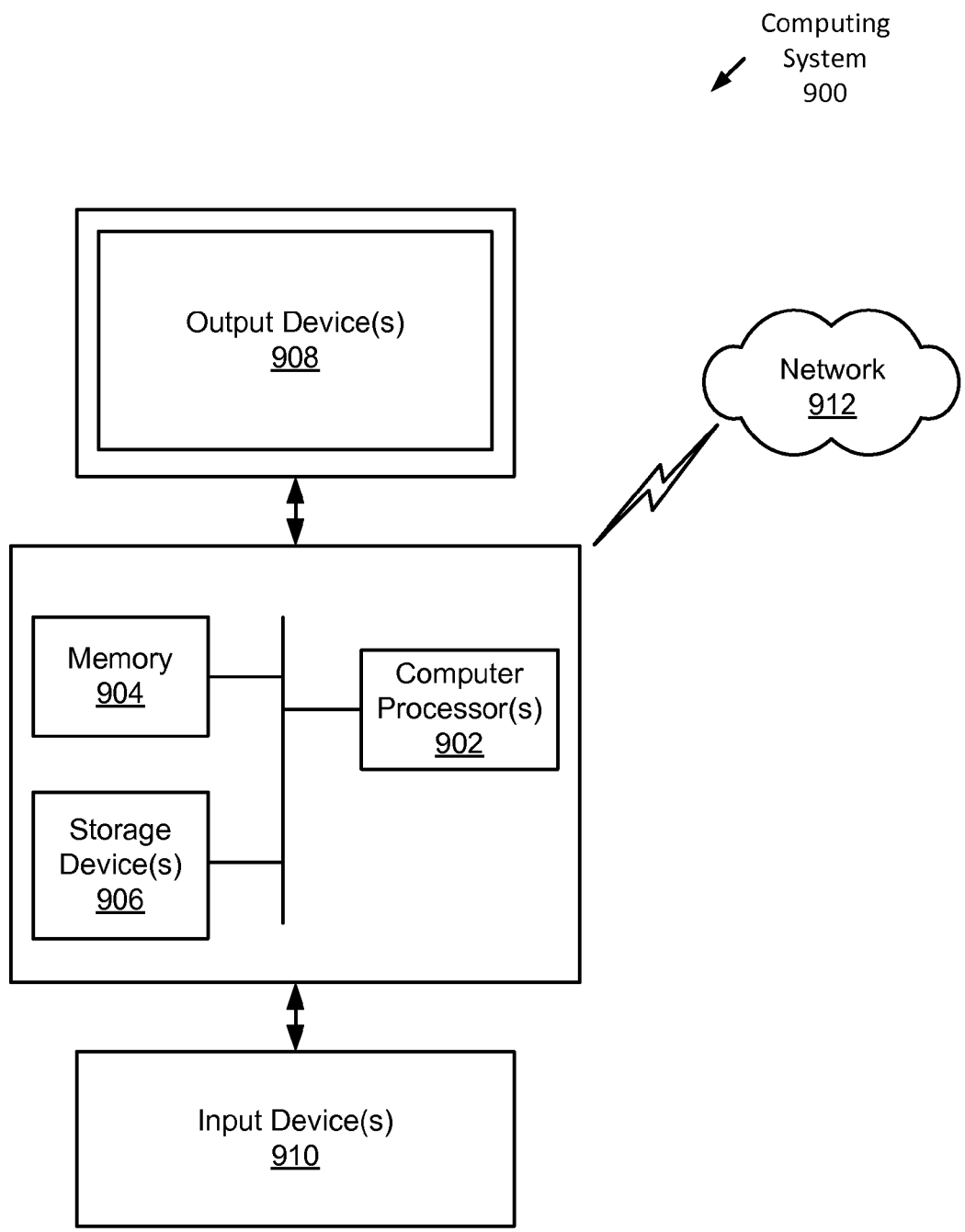
FIG. 9 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 9, the computing system (900) may include one or more computer processor(s) (902), associated memory (904) (e.g., random access memory (RAM), cache memory, flash memory, etc.), one or more storage device(s) (906) (e.g., a hard disk, an optical drive such as a compact disk (CD) drive or digital versatile disk (DVD) drive, a flash memory stick, etc.), and numerous other elements and functionalities. The computer processor(s) (902) may be an integrated circuit for processing instructions. For example, the computer processor(s) may be one or more cores, or micro-cores of a processor. The computing system (900) may also include one or more input device(s) (910), such as a touchscreen, keyboard, mouse, microphone, touchpad, electronic pen, or any other type of input device. Further, the computing system (900) may include one or more output device(s) (908), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (900) may be connected to a network (912) (e.g., a local area network (LAN), a wide area network (WAN) such as the Internet, mobile network, or any other type of network) via a network interface connection (not shown). The input and output device(s) may be locally or remotely (e.g., via the network (912)) connected to the computer processor(s) (902), memory (904), and storage device(s) (906). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (900) may be located at a remote location and connected to the other elements over a network (912). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
   a computer processor;
   a clustering engine, executing on the computer processor, configured to:
      receive an advertisement request from an application;
      generate, in response to the request, a plurality of nodes corresponding to a plurality of user-entered text strings received from a user by the application;
      send, to a marketplace system, a plurality of search queries for the plurality of user-entered text strings;
      receive a plurality of product identifiers in response to the plurality of search queries, the plurality of product identifiers comprising one or more shared product identifiers, wherein each shared product identifier is shared by one or more nodes;
      determine, for the plurality of nodes, a plurality of direct edges between pairs of nodes, each direct edge in the plurality of direct edges comprising a first node, a second node, one or more shared product identifiers shared by the first node and the second node, and an edge value indicating the number of the one or more shared product identifiers shared by the first node and the second node;
      generate a cluster using the plurality of nodes and the plurality of direct edges, wherein generating the cluster further comprises deleting a direct edge based on the edge value of the direct edge;
      select, from a direct edge of the plurality of direct edges in the cluster, a product identifier of the plurality of product identifiers to obtain a selected product identifier; and
      provide, to the application, the selected product identifier, wherein the selected product identifier identifies a product; and
   the application, executing on the computer processor, configured to:
      send the advertisement request to the clustering engine;
      receive, in response to the advertisement request, the selected product identifier; and
      display, to the user, an advertisement for the product identified by the product identifier.

2. The system of claim 1, wherein the marketplace system comprises a plurality of product data items describing a point of sale for the product.

3. The system of claim 1, wherein the application is further configured to:
   determine that the user has selected the advertisement; and
   present, to the user, a website point of sale to purchase the product using the marketplace system.

4. The system of claim 1, wherein generating the cluster using the plurality of nodes and the plurality of direct edges comprises applying a clustering algorithm to the plurality of nodes and the plurality of direct edges.

5. The system of claim 4, wherein generating the cluster using the plurality of nodes and the plurality of direct edges comprises:
   generating a plurality of clusters using the plurality of nodes and the plurality of direct edges; and
   selecting the cluster from the plurality of clusters based on a cluster selection policy.

6. The system of claim 1, wherein selecting, from the direct edge of the plurality of direct edges in the cluster, a product identifier of the plurality of product identifiers to obtain the selected product identifier comprises:
   selecting the selected product identifier based on a product identifier selection policy.

7. The system of claim 1, wherein the product identifier is a uniform resource locator for a website point of sale for the product.

8. A method for selecting a product to advertise comprising:
   receiving, by a clustering engine executing on a computer processor, an advertisement request from an application;
   generating, by the clustering engine in response to the request, a plurality of nodes corresponding to a plurality of user-entered text strings received from a user by the application;
   sending, to a marketplace system, a plurality of search queries for the plurality of user-entered text strings;
   receiving a plurality of product identifiers in response to the plurality of search queries, the plurality of product identifiers comprising one or more shared product identifiers, wherein each shared product identifier is shared by one or more nodes;
   determining, for the plurality of nodes, a plurality of direct edges between pairs of nodes, each direct edge in the plurality of direct edges comprising a first node, a second node, one or more shared product identifiers shared by the first node and the second node, and an edge value indicating the number of the one or more shared product identifiers shared by the first node and the second node;
   generating, by the clustering engine, a cluster using the plurality of nodes and the plurality of direct edges, wherein generating the cluster further comprises deleting a direct edge based on the edge value of the direct edge;
   selecting, by the clustering engine from a direct edge of the plurality of direct edges in the cluster, a product identifier of the plurality of product identifiers to obtain a selected product identifier; and
   providing, to the application, the selected product identifier, wherein the application displays, to the user, an advertisement for the product identified by the selected product identifier.

9. The method of claim 8, further comprising:
   determining, by the application, that the user has selected the advertisement; and
   present, to the user, a website point of sale to purchase the product using the marketplace system.

10. The method of claim 8, wherein generating the cluster using the plurality of nodes and the plurality of direct edges comprises applying a clustering algorithm to the plurality of nodes and the plurality of direct edges.

11. The method of claim 8, wherein generating the cluster using the plurality of nodes and the plurality of direct edges comprises:
   generating a plurality of clusters using the plurality of nodes and the plurality of direct edges; and
   selecting the cluster from the plurality of clusters based on a cluster selection policy.

12. The method of claim 8, wherein selecting, from the direct edge of the plurality of direct edges in the cluster, a product identifier of the plurality of product identifiers to obtain the selected product identifier comprises:
   selecting the selected product identifier based on a product identifier selection policy.

13. The method of claim 8, wherein the product identifier is a uniform resource locator for a website point of sale for the product.

14. The method of claim 8, wherein the application is a financial management application.

15. A computer readable medium comprising instructions that, when executed by a computer processor, perform a method for selecting a product to advertise, the method comprising:
   receiving, by a clustering engine executing on a computer processor, an advertisement request from an application;
   generating, by the clustering engine in response to the request, a plurality of nodes corresponding to a plurality of user-entered text strings received from a user by the application;
   sending, to a marketplace system, a plurality of search queries for the plurality of user-entered text strings;
   receiving a plurality of product identifiers in response to the plurality of search queries, the plurality of product identifiers comprising one or more shared product identifiers, wherein each shared product identifier is shared by one or more nodes;
   determining, for the plurality of nodes, a plurality of direct edges between pairs of nodes, each direct edge in the plurality of direct edges comprising a first node, a second node, one or more shared product identifiers shared by the first node and the second node, and an edge value indicating the number of the one or more shared product identifiers shared by the first node and the second node;
   generating, by the clustering engine, a cluster using the plurality of nodes and the plurality of direct edges, wherein generating the cluster further comprises deleting a direct edge based on the edge value of the direct edge;
   selecting, by the clustering engine from a direct edge of the plurality of direct edges in the cluster, a product identifier of the plurality of product identifiers to obtain a selected product identifier; and
   providing, to the application, the selected product identifier, wherein the application displays, to the user, an advertisement for the product identified by the selected product identifier.

16. The computer readable medium of claim 15, the method further comprising:
   determining, by the application, that the user has selected the advertisement; and
   presenting, to the user, a website point of sale to purchase the product using the marketplace system.

17. The computer readable medium of claim 15, wherein generating the cluster using the plurality of nodes and the plurality of direct edges comprises applying a clustering algorithm to the plurality of nodes and the plurality of direct edges.

18. The computer readable medium of claim 15, wherein generating the cluster using the plurality of nodes and the plurality of direct edges comprises:
   generating a plurality of clusters using the plurality of nodes and the plurality of direct edges; and
   selecting the cluster from the plurality of clusters based on a cluster selection policy.

19. The computer readable medium of claim 15, wherein selecting, from the direct edge of the plurality of direct edges in the cluster, a product identifier of the plurality of product identifiers to obtain the selected product identifier comprises:
   selecting the selected product identifier based on a product identifier selection policy.

20. The computer readable medium of claim 15, wherein the product identifier is a uniform resource locator for a website point of sale for the product.

* * * * *